UNITED STATES PATENT OFFICE.

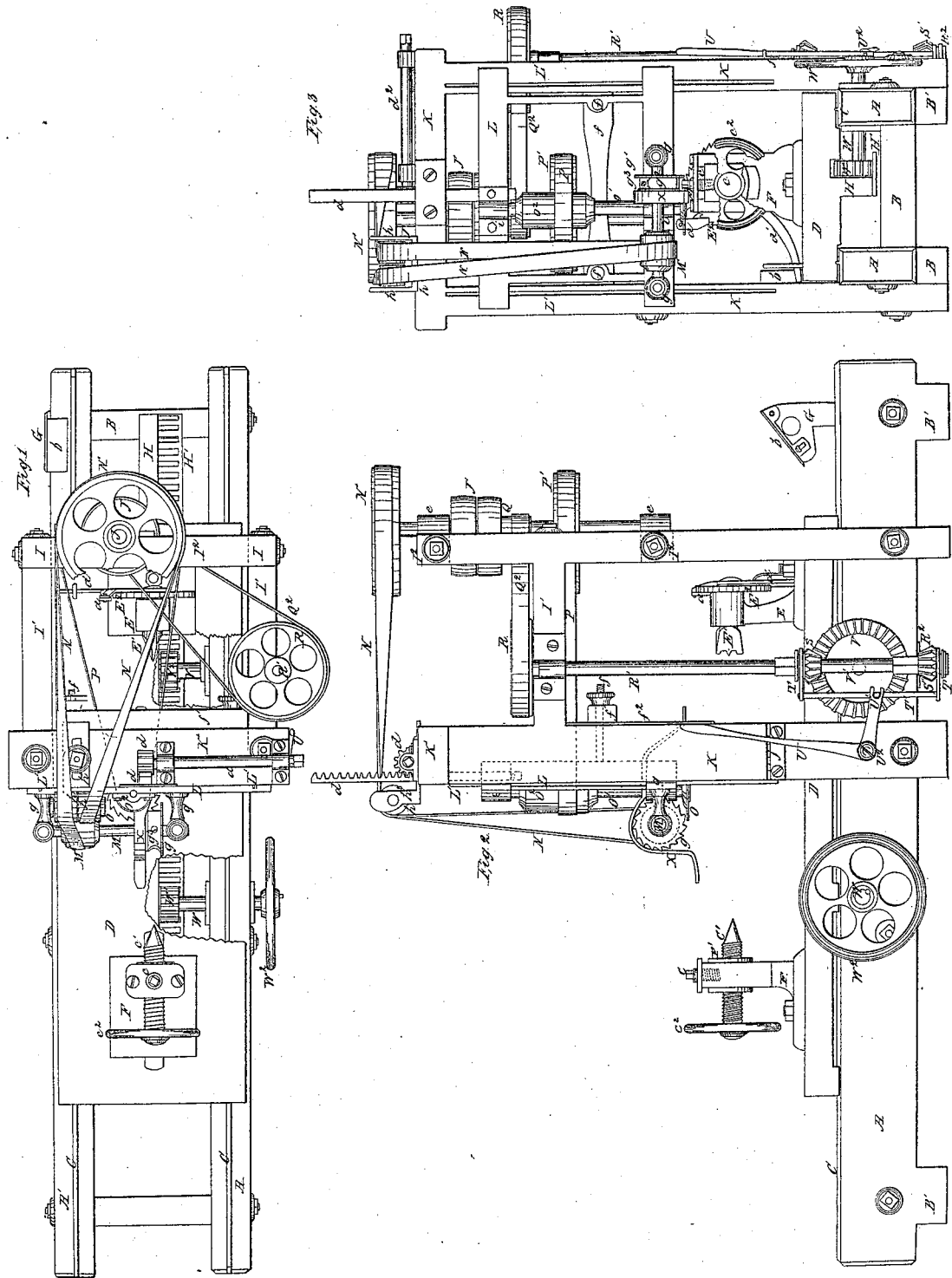

JACOB PEIRSON, OF ALEXANDRIA, VIRGINIA.

MACHINE FOR MANUFACTURING HOOPS.

Specification of Letters Patent No. 12,429, dated February 20, 1855.

*To all whom it may concern:*

Be it known that I, JACOB PEIRSON, of Alexandria, in the county of Alexandria and State of Virginia, have invented a new and useful Machine for Planing and Cutting Hoops, &c., from a Log Parallel or Nearly Parallel with the Grain of the Wood; and I do hereby declare that the same is described and represented in the following specifications and drawings.

To enable others skilled in the art to make and use my invention I will proceed to describe its construction and operation referring to the drawings, in which the same letters indicate like parts in each of the figures.

Figure 1 is a plan or top view. Fig. 2 is an elevation of one side. Fig. 3 is an elevation of one end.

The nature of my invention consists in operating a cutter so as to cut and plane a portion of a log parallel or nearly parallel with the grain of the wood, to form a hoop or other article; in combination with a saw or cutter to separate the portion so cut and planed from the log; also in making the rests or guides which govern the position of the cutter and saw to traverse on the log so as to cut the hoop or other article parallel or nearly parallel with the grain of the wood. In the above mentioned drawings A A′ are the side rails of the frame connected together by the cross bars B B and supported by the posts B′ B′. The ways C C are fastened upon the top of the rails A A′ for the carriage D to traverse upon, and carry the head and tail stocks E F which are fastened to it. The head stock E is provided with a spur center E′ fitted to turn freely in it which center has the ratchet wheel $E^2$ fastened to it so as to be acted upon by the pawl $a$ on the upper end of the lever $a′$ which lever is raised by the inclined plane $b$ when the carriage is run forward and after it passes the plane $b$ that raised it, it falls down and turns the center E′ by the pawl $a$ catching into the ratchet wheel $E^2$ and moves the log for a new cut. The stand G is fastened to the rail A′ to support the inclined plane $b$ which is hinged to its upper corner so as to be raised by the end of the lever $a′$ as it passes under it when the carriage moves back again after being run forward. The tail stock F is provided with a movable box or nut F′ which is traversed perpendicularly by the screw $c$ to raise and lower the screw center $c′$ which supports the large end of the log to make the top of said log level if one end is larger than the other, the small end of the log being supported by the spur center E′. The screw center $c′$ may be turned by the hand wheel $c^2$ to force it forward into the log. The bar H is fastened to the underside of the carriage D to carry the rack H′ which is fastened to the underside of the bar H as represented.

The posts I I are fastened to the rails A A′ and are connected together by the bars $I^2$ $I^2$ which support the boxes $e$ $e$ in which the main shaft J turns which is provided with pulleys J′ for the belt which is to operate the machine.

The posts K K are fastened to the rails A A′ and are connected together by the top bar K′ and to the posts I I by the bars I′ I′. The ways L′ are fastened to the posts K K for the carriage L to traverse on, which carriage may be traversed by the rack $d$ acted upon by the pinion $d′$ on the shaft $d^2$ which turns in boxes fastened to the bar K′ and may be turned by a crank applied to the end of the shaft. The lower end of the rack $d$ is fitted to traverse freely in the top bar of the carriage so that when the rack is run down the carriage may be moved as will be hereafter described without moving the rack. The carriage L is held against the ways L′ by the screw bolts $f$ $f$ which connect it to the bar $f′$ fitted to traverse on the ways $f^2$ $f^2$ fastened to the posts K K.

The shaft M turns in the studs $g$ $g$ fastened to the carriage L and carries the circular saw $g′$ and cutter head $g^2$ with the cutters $g^3$ $g^3$ fastened to it which cutters shape that portion of the log which is to form the hoop or other article. A band N from the pulley N′ on the shaft J passes over the pulleys $h$ $h$ and around the pulley M′ on the shaft M to turn it with the saw and cutters. The pulleys $h$ $h$ turn on a pin in the stand $h′$ which stand is fastened to the bar K′. The saw O which separates the piece from the log which is shaped by the cutters $g^3$ is fastened to the perpendicular shaft O′ which turns in the boxes $i$ $i$ fastened to the carriage L and is provided with a pulley $O^2$ and operated by the band P from the pulley P′ on the shaft J. The shaft J is provided with a pulley Q which carries the band $Q^2$ and turns the pulley R and shaft R′ which shaft turns in a box fastened to the bar I′, and in the stand $R^2$ fastened to the rail A. The shaft R′ is made square where the pinions S and S' traverse upon it which pinions are provided with scores for the forks T T which embrace them and which forks are connected together by the bar T' which has a pivot on it embraced by the fork U' of the lever U which lever vibrates on the screw U² in the post K. The bracket $j$ is fastened to the post K and is provided with three scores for the lever U so arranged that the lever may be made to hold both of the pinions S and S' out of gear, or clear of the wheel V, or hold either of said pinions into gear with the wheel V to turn it as required to operate the shaft V' and pinion V² which acts on the rack H' and traverses the carriage D. The shaft V' turns in boxes fastened to the rail A.

There is a short shaft W similar to the shaft V' which turns in boxes fastened to the rail A which shaft is provided with a pinion W' to act on the rack H' when the shaft is turned by the hand wheel W² fastened to said shaft.

The crooked rest X is fastened to the carriage L and it is bent so that each end may rest and traverse on the log operated upon, and support the carriage L, and it is intended that the carriage shall have full liberty to rise and fall and accommodate itself to the curves in the log so as to cut the hoops as near parallel with the grain of the wood as possible. Besides the saws and cutter pass entirely beyond the end of the log in each direction so that the weight of the carriage is supported alternately by the opposite ends of the rest X. The center of the curve in the cutter $g^3$ should be directly over the centers C' and E' so as to form the hoop upon the top of the log, so that the saw O will sever the hoop from the log at right angles to the radius of the log and cut the same distance each side of a radius drawn perpendicularly. The cutter $g^3$ should be made straight beyond the curve and on the opposite side from the saw, as wide as may be necessary to remove all the superfluous wood at the large end of the log, which is not required to form the hoops, and which wood, if not removed might interfere or obstruct the rest X.

The machine having been constructed and completed as above described, and a log placed between the centers C' and E', the former being adjusted so as to make the top of the log nearly level, the carriage D traversed so as to bring the head stock E under the cutter $g^3$, the carriage L is lowered by the rack $d$ so as to let the rest X bear upon the log, and the machine set in motion; the pinion S is made to turn the wheel V and traverse the log under the cutter $g^3$ which forms and planes a hoop which is severed from the log by the saw O. After the log passes the cutter and saw the inclined plane $b$ raises the lever $a'$ and moves the pawl $a$ on the ratchet wheel so that when the lever $a$ falls after passing the inclined plane $b$ it turns the log until the side of the rabbet formed by the cutter and saw comes in contact or against the rest X when the attendant moves the lever U so as to traverse the carriage in the opposite direction and make another hoop, the cutter $g^3$ cutting against the grain of the wood, and by adding another inclined plane like $b$ to act on the lever $a'$ when the cutter is over the head-stock E it will set the log for a new cut. But if for any cause it should be desirable to cut with the grain of the wood, only an inclined plane like $b$ may be placed so as to change the lever and log when the cutter is over the head stock E only, if the cutter only cuts when the carriage is moving in one direction, the gearing may be arranged to move the carriage faster when it is running back so as to save time. I contemplate that the cutters may be made of such a shape as may be necessary, to cut the hoops or other articles in such form as may be most desirable, and that the saw $g'$ may be dispensed with, as the machine may be made to operate with or without it; but I prefer to make it from a part of the cutter, which cuts away the wood, and forms the hoop upon the log; also that the machine may be modified in various ways without departing from the merits or principles of my invention. It is hardly necessary to add that cutting the hoops parallel or nearly parallel with the grain of the wood makes them much stronger and better than if they were cut otherwise.

What I claim as my invention and desire to secure by Letters Patent is—

1. A vibrating or traversing frame carrying a rotary cutter, so constructed and arranged that the cutter may be made or allowed to plane or cut its full depth, or a proper depth in crooked as well as straight logs, so as to make the hoop or other article formed by the cutter parallel, or nearly parallel with the grain of the wood substantially as described.

2. In combination with the frame and cutter mentioned in the first claim, I, claim the circular saw O, so arranged and operated as to separate the hoop or article formed (by the abovementioned cutter) from the log substantially as described.

3. In making the rests or guides X which govern the position of the traversing frame rotating cutter and saw O to traverse on the log substantially as described so as to cut the hoop or other article parallel or nearly parallel with the grain of the wood.

JACOB PEIRSON.

Witnesses:
 I. DENNIS, Jr.,
 SAML. GRUBB.